United States Patent [19]
Jones et al.

[11] 3,754,906
[45] Aug. 28, 1973

[54] ELECTROPHOTOGRAPHIC COMPOSITIONS AND PLATES AND METHODS OF MAKING AND USING SAME

[75] Inventors: Frederick L. Jones, Dayton, Ohio; Richard A. Connell, Wilton, Conn.

[73] Assignee: Pitney-Bowes, Inc., Stamford, Conn.

[22] Filed: Apr. 16, 1971

[21] Appl. No.: 134,730

[52] U.S. Cl............... 96/1.4, 96/1.5, 96/1.8, 252/501, 106/296, 106/301
[51] Int. Cl................................. G03g 5/08
[58] Field of Search................. 96/1.5, 1.8; 252/501

[56] References Cited
UNITED STATES PATENTS

| | | | |
|---|---|---|---|
| 3,121,006 | 2/1964 | Middleton et al. | 96/1 |
| 3,379,527 | 4/1968 | Corrsin et al. | 96/1.5 |
| 3,533,783 | 10/1970 | Robinson | 96/1 |
| 3,598,643 | 8/1971 | Hodes | 117/201 |
| 3,598,760 | 8/1971 | Nakamura et al. | 252/501 |

*Primary Examiner*—George F. Lesmes
*Assistant Examiner*—M. B. Wittenberg
*Attorney*—William D. Soltow, Jr., Albert W. Scribner, Martin D. Wittstein and Louis A. Tirelli

[57] ABSTRACT

A photoconductive composition and electrophotographic plates made therefrom are disclosed comprising the combination of particulate cadmium sulfoselenide and zinc oxide pigments as the photoactive constituents. The plates have increased electrophotographic speed and broad spectral response for use in electrophotography. In the processing of the photoconductive composition heating of the pigments results in improved charge acceptance and electrophotgraphic speed of a plate made from the composition. The plate compositions disclosed comprise a styrene modified alkyd resin binder in which the Cd(SSe)-ZnO pigments are dispersed.

12 Claims, 9 Drawing Figures

EFFECT OF HEATING ON ACCEPTANCE VOLTAGE

FIG. 9

EFFECT OF HEATING TIME ON $t_{1/2}$ (SPEED)

INVENTORS.
FREDERICK L. JONES
RICHARD A. CONNELL
BY:
BLAIR ST. ONGE MAYERS & CAHILL
ATTORNEYS.

ELECTROPHOTOGRAPHIC COMPOSITIONS AND PLATES AND METHODS OF MAKING AND USING SAME

BACKGROUND OF THE INVENTION

This invention relates to photoconductive compositions, electrophotographic plates employing such compositions and methods of making and using such compositions and plates.

In the field of electrophotography there are a number of known photoconductive insulating compositions which have the general properties of accepting an electrical charge, holding such a charge in the dark and then being discharged when exposed to a light pattern to form a latent image whereby a particulate developer is then adhered to the remaining charged areas to develop the image. In general these electrophotographic processes may be described as the direct process and the indirect process. The direct process comprises the forming of a latent image on the final copy sheet itself and then developing the image directly thereon generally from a liquid medium containing the electroscopic marking particles. The indirect process comprises the formation of a latent image on a photoconductive composition, its development with electroscopic resinous marking material, after which the resulting image is transferred to paper placed in contact with the photoconductive composition. The image is then fixed by softening the resinous marking material with heat and fusing it to the paper.

For use with either the direct or indirect electrophotographic process the photoconductive composition of the copy sheet or electrophotographic plate should generally possess the following photoelectric characteristics. (1) It must be capable of being electrically charged to a relatively high voltage and to substantially hold such a charge for at least several seconds in the dark. (2) The photographic speed of the composition must be fast enough to be commercially accepted for electrophotographic purposes. (3) The photoconductive insulating composition must be capable of being substantially completely discharged under light so that the residual voltage remaining thereon does not result in an undersirable background on subsequent copies.

There are a number of known photoconductive insulating materials in the prior art which have been used with varying degrees of success including pigments such as cadmium sulfide, cadmium selenide and cadmium sulfoselenide as disclosed in U. S. Pat. Nos. 3,121,006; 3,121,007; 3,151,982; 3,288,604 and 3,109,753. Cadmium sulfoselenide has also been used in conjunction with activator metals such as silver or copper and with or without co-activators, generally halides such as chlorine, bromine and iodine and/or combined with metal impurities or metal salts of zinc as disclosed in British Pat. No. 1,201,128. Still further, compositions of various sulfides and selenides of cadmium and zinc have been used as photoconductors as disclosed for example in U. S. Pat. No. 3,121,006.

It is further well known that zinc oxide possesses photoconductive insulating properties which have been found to be commercially useful in electrophotography when dye sensitized such as is generally disclosed in U. S. Pat. Nos. 3,121,006; 3,471,625; 3,052,539 and 3,052,540. Dye sensitized zinc oxide has been generally used as the principal constituent for a photoconductive insulating composition in the direct electrophotographic method.

There has been a continuing effort to develop photoconductive compositions for use in electrophotography which have increased electrophotographic speeds. Other problems with photoconductive compositions relate to the high residual voltages remaining on the electrophotographic plate after attempts to completely discharge the plate, resulting in difficulty in cleaning the plate for repeated use in the indirect electrophotographic process. Further problems have also been encountered in electrophotographic plates in that there is a relatively narrow spectral response for some of these compositions, necessitating the use of special light sources and/or limited ability to reproduce certain colors from copied material. Cadmium sulfoselenide and zinc oxide when used alone as the photoactive constituent of electrophotographic plate exhibit one or more of the above shortcomings.

Cadmium sulfide and cadmium selenide have been used very successfully in highly sensitive photocell devices. Used in powder form in a resinous binder as an electrophotographic plate, both CdS and CdSe are sufficiently insulating to retain a charge, but exhibit relatively high residual voltages after attempts to completely discharge the plate with light. Such performance is of course unsatisfactory for the practice of electrophotography, since it can result in dark background areas and reduced contrast.

One explanation for high residual voltages is that in insulating samples of such photoconductive materials, the effective distance, or "range" in which a light generated charge carrier can move, is so severely limited by local imperfections acting as "traps" and "recombination centers" that the layer cannot be completely discharged. This effect is most pronounced when the incident light is strongly absorbed by the photoconductor, as is the case for CdS and blue light, for instance. Then the light generated carriers are all created at the front surface of the layer, and have to migrate across the entire layer to discharge it.

One approach to the elimination or reduction of such electron traps has been to limit the thickness of the photoconductive insulating layer. While a thin photoconductive insulating layer accommodates a limited range of electron transport for discharge of the exposed areas of the plate, it also limits the electrical charge acceptance of the plate itself which may limit the use of such an electrophotographic plate in commercial Another approach has been to provide a photoconductive composition employing a photoconductor mixed with a material having a low optical absorption coefficient to the radiation to which the plate is exposed as set forth in British Pat. No. 1,181,172. Such a composition theoretically is to permit penetration of the photoconductive layer by the radiation to reduce or eliminate trapping within the layer. It has been found in practice, however, that electrophotographic speed is not substantially increased by the provision of radiation transparent material in the photoconductive insulating layer.

SUMMARY OF THE INVENTION

The invention comprises the combination of particulate cadmium sulfoselenide and zinc oxide as the photoactive constituent of a photoconducting insulating composition for use in electrophotography. More particularly the invention comprises the combining of particulate zinc oxide pigment with particulate cadmium sulfoselenide pigment having from about 5 to 50 atomic percent selenium with respect to sulfur in the cadmium sulfoselenide.

The ratio of selenium to sulfur as mole percent can be expressed as $[n(Se)/n(S)+n(Se)] =$ from 0.05 to 0.7 where $n$ is the number of atoms of selenium or sulfur in the solid solution of cadmium sulfoselenide pigment. A ratio of from about 40 to 60 mole percent selenium is indicated to give very good results and is preferred.

The ratio of selenium to sulfur in the cadmium sulfoselenide pigment may also be expressed by the formula $CdS_xSe_{1-x}$ wherein $x$ is less than 1 but greater than 0. In the preferred ratio of 40–60 mole percent selenium and cadmium sulfoselenide is deep red to maroon in color.

Both the cadmium sulfoselenide and the zinc oxide are preferably pigment grade materials and the zinc oxide should be made by the known French process so that it is electrophotographic. The cadmium sulfoselenide pigment is a solid solution of cadmium sulfide and cadmium selenide. The particle sizes of the combined pigments may vary somewhat, but for the examples herein the average particle size of the zinc oxide was about one-half micron and that of the cadmium sulfoselenide about 2 microns. The invention also comprises the process of preparing the photoactive materials and the photoconductive insulating composition including the step of heating the cadmium sulfoselenide to a temperature of from 350°–400° for from 10 minutes to about 8 hours either alone or mixed with the zinc oxide and preferably at about 375°C from one-half to 2 hours. The cadmium sulfoselenide and zinc oxide is then dispersed in an appropriate binder, preferably a styrene modified alkyd resin in a suitable solvent such as toluene or xylene. The composition of cadmium sulfoselenide, zinc oxide and binder is then spread on a substrate such as electrically conducting paper or aluminum, the solvent is driven off and an electrophotographic plate is obtained for use with either the direct or indirect electrophotographic process. Because of the red coloration of the electrophotographic plate the indirect process is more suitable with the composition of the invention.

The combination of cadmium sulfoselenide and zinc oxide as the photoactive combination of the composition provides substantially increased electrophotographic speed with low residual voltage. The heating of the cadmium sulfoselenide unexpectedly increases the maximum charge acceptance for a xerographic plate made with the composition of these two photoactive compositions. The composition also provides an electrophotographic plate having a relatively good response over a substantial portion of the visible light spectrum. Such a broad spectral response and fast electrophotographic speed make the combination suitable for commercial electrophotographic applications.

Accordingly, it is an object of the invention to provide photoconductive compositions having increased electrophotographic speeds and a broad spectral response.

Another object of the invention is to provide electrophotographic plates and methods of making and using such plates with the above photoactive composition.

It is a further object of the invention to provide such compositions and plates having commercially acceptable electrical characteristics.

Other objects of the invention will in part be obvious and will in part appear hereinafter.

BRIEF DESCRIPTION OF THE DRAWINGS

The quantum yields of all the curves in FIGS. 1 through 7 represent the calculated yield of electrons per photons from a visible light source of the wavelength shown (in nanometers) on each graph.

DETAILED DESCRIPTION OF THE PREFERRED EMBODIMENT OF THE INVENTION

The combination of cadmium sulfoselenide and zinc oxide as a photoconductive insulating compound has provided electrophotographic speeds at least five to ten times that of known commercially used electrophotographic plates. It has also been found that the combination of cadmium sulfoselenide and zinc oxide, particularly in the range of from 20% to 70% cadmium sulfoselenide and from 30% to 80% zinc oxide, provides a broad spectral response with substantial uniformity across most of the visible spectrum, particularly with the formulation using about 20% to 40% cadmium sulfoselenide and 60% to 80% zinc oxide and preferably about 30% Cd(SSe) and 70% ZnO. It has also been found that improved electrophotographic speed is attained over a fairly wide range of ratios of sulfur to selenium in the cadmium sulfoselenide pigments, and particularly those which are deeper red and have a higher proportion of selenium than do the higher reds or oranges. While some of the electrical characteristics of cadmium sulfoselenide and zinc oxide may vary depending upon source, the increased electrophotographic speed and broad spectral response is present regardless of the source of the pigments.

The ratio of selenium to sulfur in the cadmium sulfoselenide can vary widely with results that would be considered to be commercially satisfactory. Near the lower end of selenium content it was found that an orange pigment of Cd(SSe) containing about 13 mole percent Se to S-Se gave good results when combined with zinc oxide to form an electrophotographic plate in accordance with the invention. The results were substantially better than those when using a cadmium sulfide yellow pigment containing no selenium.

Even better results were obtained with higher proportions of selenium. In initial investigation of a dark maroon cadmium sulfoselenide pigment, believed to nominally contain about 60 mole percent selenium to sulfur-selenium, very good results were obtained when the Cd(SSe) was combined with the zinc oxide and made into an electrophotographic plate. Accordingly, the deep red colored cadmium sulfoselenide having from 40 to 60 mole percent Se to S-Se are preferred.

In the process of making the photoactive composition, it has been found that the heating of the cadmium sulfoselenide to a temperature of about 375°C. for from one-half hour to 2 hours will substantially improve the charge acceptance and the speed of an electrophotographic plate employing the combined Cd(SSe) and ZnO. The heating of the cadmium sulfoselenide may take place prior to or after after it is mixed with the zinc oxide. While the heating of the Cd(SSe) may not be necessary in all applications of the invention, it is generally preferred for the making of a commercial electrophotographic plate.

It has also been found that the binder system employed in making the electrophotographic plate has a measurable and significant effect on the charge acceptance and electrophotographic speed of the plate. For the photoactive combination of cadmium sulfoselenide and zinc oxide in accordance with the invention, it has been found that a styrene modified alkyd resin binder gives the best overall results with respect to charge acceptance, electrophotographic speed and residual voltage. While other binder systems may be employed in some applications it is preferred to use a styrene modified alkyd resin binder with the photoactive compositions of the present invention.

The above features and aspects of the invention having been set forth, the following examples are presented as illustrative, but not as limitations on the invention, with respect to the photoactive combination of cadmium sulfoselenide and zinc oxide and the electrophotographic plates made therefrom and the methods of making and using such plates.

For the examples herein the following definitions are applicable:

Maximum Charge Acceptance: The maximum electric charge density per unit area that an insulating layer is capable of sustaining without breakdown.

Maximum Acceptance Potential: The maximum voltage which can be impressed upon an insulating layer without breakdown. In the absence of space charge within the layer, the maximum acceptance potential and the maximum charge acceptance are related by the simple expression Qmax = C Vmax, where C is the capacitance per unit area.

Dark Decay: The loss or leakage of charge from an insulating layer in the dark usually expressed in terms of volts per second. In the absence of space charge, $dQ/dt = dV/dt$ expresses the relation between voltage decay and charge decay. $T_{1/2}$: A commonly used measure of the sensitivity of an electrophotographic layer, expressed in terns of the time in seconds required to discharge a layer of 50% of its initial surface voltage, under a specified intensity of illumination, commonly expressed in foot candles (ft.cd.). More precisely, this speed of discharge can be related to the half value exposure, $E_{1/2} = [IT]_{1/2}$ commonly expressed in foot-candle-seconds (ft.cd.sec.).

Residual Voltage: The voltage remaining on an electrophotographic layer after an exposure adequate to substantially discharge it. In the following examples, the voltage remaining after an exposure of one foot-candle-second was taken to be the residual as a matter of convenience.

For measuring the electrical characteristics of the electrophotographic plates of the following examples a Victoreen electrostatic paper analyzer was used. The Victoreen electrostatic paper analyzer is a well-known testing instrument for measuring basic voltage values for electrophotographic plates. In the instrument the sample plate is placed on a small turntable which is rotated to pass the sample over an exposure area which is illuminated by an incandescent lamp. For the following examples the sample plate was irradiated by light reflected from a magnesium oxide diffusing surface and transmitted through an electrically conducting (NESA) glass electrode. The light level was initially adjusted by means of a mechanical shutter to give a meter reading of 10 foot-candles with the cadmium sulfide photocell incorporated in the machine. The light intensity was then reduced by the insertion of a Wratten neutral density filter, n.d. equals 2.0 to give an effective light level of 0.1 foot-candle. The light source used for these examples was an incandescent lamp with a color temperature of 2,800° C.

EXAMPLE I

An electrophotographic layer comprising a cadmium sulfoselenide red pigment combined with photoconductive zinc oxide in a ratio of 3:7 was prepared as follows:

Eighteen grams of dark red cadmium sulfoselenide pigment No. V8840 from the Ferro Corporation was intimately mixed with 42 grams of New Jersey Zinc Photox 80 zinc oxide in a 250 ml. beaker by means of a spatula. The mixed pigments were transferred to a 50 milliliter Vycor crucible, tamped and heated, uncovered, for 15 minutes at 375°C. in a muffle furnace.

The crucible and contents were allowed to cool in room-temperature air. The room temperature pigment was then transferred to a Waring blender to which had been added 20 grams of DeSoto E-09, a styrene modified alkyd resin and 45 grams of toluene as a solvent. The total pigment to binder ratio was 6:1. The mixture was blended for two minutes at 80 volts using a Powerstat variable autotransformer with the blender speed indicator in the low position.

The blended mixture having 55% solids was transferred to a covered jar. On the following day the mixture was stirred to obtain a thoroughly uniform particle dispersion, and was then coated on a sheet of Riegel conductive base paper, EC45AA, using a No. 32 Mayer rod. After flashing off the free toluene the coated sheet was heated overnight in a 50°C. oven. The dried and heated coated sheet was brought to room temperature and the following measurements on the Victoreen electrostatic paper analyzer and recorder were obtained:

Maximum charge acceptance, Vmax . . . 580 Volts
Dark decay . . . 6 Volts/Second
$T_{1/2}$ (I=0.1 ft.cd.) . . . 1.2 Seconds
Residual (1 ft.cd.second) . . . 20 Volts The layer was charged in the dark by a negative corona in the normal electrophotographic manner, and contact exposed with a metal test stencil having fine line and broad patterns to room fluorescent illumination for one second. When the stencil was removed and the xerographic layer was brought in contact with Bruning positive dry toner in a magnetic iron carrier, the non-light-struck areas accepted a dense image of the toner, whereas the light-struck areas were entirely free of tone. A piece of plain bond paper was charged on one side with a negative corona, and that side was brought in initimate contact with the selectively toned image. When the bond paper was removed, the toner pattern was practically completely transferred from the xerographic layer with excellent pattern fidelity. The slight amount of residue was easily and completely removed by lightly brushing with a soft tissue paper. The toned image on the bond paper was fixed by exposing the paper and image to the glowing wires of a nichrome coil heater at a safe distance to fuse the toner, but to prevent damage to the paper.

EXAMPLES 2 THROUGH 6

To ascertain the effect of different ratios of Cd(SSe) to ZnO, the following series of electrophotographic plates were made and tested. Other than the cadmium sulfoselenide to zinc oxide ratios, the constituents and method of preparation of the plates were the same as in Example 1. The voltage measurements were made with the same Victoreen instrument.

| EXAMPLE | 2 | 3 | 4 | 5 | 6 |
|---|---|---|---|---|---|
| Ratio of Cd(SSe) to ZnO by Weight | 10:0 | 7:3 | 1:1 | 2:8 | 1:9 |
| Maximum Charge Acceptance, Volts | 1150 | 600 | 780 | 680 | 620 |
| Dark Decay, Volts/Second | 7 | 10 | 11 | 8 | 8 |
| T ½ (I=0.1 ft.-cd.) Second | 3.0 | 1.6 | 1.6 | 1.5 | 2.5 |
| Residual (1 ft.-cd.-sec.), Volts | 75 | 30 | 25 | 30 | 80 |

Except for Examples 2 and 6 which have higher residual voltage and somewhat lower speeds, the above examples exhibit excellent speed and discharge characteristics for electrophotographic applications.

EXAMPLES 7 AND 8

The effect on electrophotographic characteristics as indicated by Victoreen measurements by varying the pigment-to-binder ratio is shown in Examples 7 and 8. Except for the composition, which is indicated below, the preparation of the layers is identical to that of Example 1. The interest in a lower pigment-to-binder ratio is possibly to obtain certain physical or mechanical properties such as abrasion resistance, gloss, flexibility, and adhesion.

| EXAMPLE | 7 | 8 |
|---|---|---|
| Cadmium Sulfoselenide (Ferro Dark Red No. V8840) grams | 18 | 18 |
| (Zinc Oxide) grams | 42 | 42 |
| DeSoto E-09 grams | 40 | 30 |
| Toluene grams | 45 | 45 |
| Pigment/Binder | 3/1 | 4.5/1 |
| Maximum Charge Acceptance, Volts | 400 | 520 |
| Dark Decay, Volts/Second | 6 | 8 |
| T ½ (I=0.1 ft.-cd.), Second | 1.2 | 1.0 |
| Residual (1 ft.-cd.-sec.), Volt | 20 | 20 |

The above results show that except for somewhat decreased charge acceptance, xerographic layers as prepared above are very similar to those having the 6:1 ratio of pigment to binder of Example 1.

EXAMPLES 9 THROUGH 20

The following examples illustrate the effect of heating the Cd(SSe) and ZnO, both in speed and in charge acceptance. It is significant to note, however, that substantial speeds do not necessarily require a pigment preheat treatment. In these examples, one or both pigments were heated, either individually or separately, in air at 375°C. (710°F.) for 30 minutes. Samples labeled "together" were prepared by hand mixing the dry pigment powders before heating or adding binder solution. All remaining samples were individually mixed with binder solution and subsequently combined. In each case the ZnO/Cd(SSe) ratio was 7 to 3. Total pigment-/binder ratio was 6 to 1, using a solvent-binder system of 84.5% xylene – 15.5% DeSoto E-09. Samples were then dispersed by ball-milling for 30 minutes using stainless steel balls. Coating was done with a No. 50 Mayer rod on aluminum substrates. The resulting coatings were stored overnight in the dark before testing. The pigments used in Examples 9 through 14 were Ferro Dark Red No. 8840 cadmium sulfoselenide and AZO 661 photoconductive zinc oxide produced by American Zinc Co. Similar results were obtained using Photox 80, or Photox 801 (both from New Jersey Zinc) instead of AZO 661 as the zinc oxide. It can be seen that the roasting

| | Example | | | | | |
|---|---|---|---|---|---|---|
| | 9 | 10 | 11 | 12 | 13 | 14 |
| | Control both at R.T. | | One pigment heated | | Both pigments heated | |
| | Together | Separate | ZnO htd. | Cd.(S. Se) htd. | Together | Separate |
| Vo (volts) | 700 | 630 | 570 | 740 | 610 | 680 |
| D.D. (V/sec.) | 23 | 20 | 20 | 10 | 10 | 12 |
| $T_{1/2}$ (I=0.1 ft. cd.) sec | 1.8 | 1.6 | 1.4 | 1.4 | 1.8 | 1.4 |
| Residual (1 ft. cd. sec.) | 20 | 5 | 7 | 5 | 20 | <5 | of the pigments may produce a modest increase in speed and/or charge acceptance potential. More marked results were obtained when Photox 85 was the zinc oxide used, as shown in Examples 15 through 20:

|  | Example | | | | | |
|---|---|---|---|---|---|---|
|  | 15 | 16 | 17 | 18 | 19 | 20 |
|  | Control both at R.T. | | One pigment heated | | Both pigments heated | |
|  | Together | Separate | ZnO htd. | Cd. (S. Se) htd. | Together | Separate |
| V₀ | 750 | 790 | 830 | 710 | 950 | 800 |
| D.D | 30 | 25 | 40 | 25 | 20 | 45 |
| T₁/₂ | 6.1 | 4.0 | 2.1 | 1.7 | 3.9 | 1.3 |
| Residual | 185 | 125 | 20 | 20 | 95 | 20 |

In Examples 15 through 20 it can be seen that heating the pigments can have a substantial effect on speed and residual voltage, if one, and preferably both pigments are heated, preferably separately.

Figure 8:
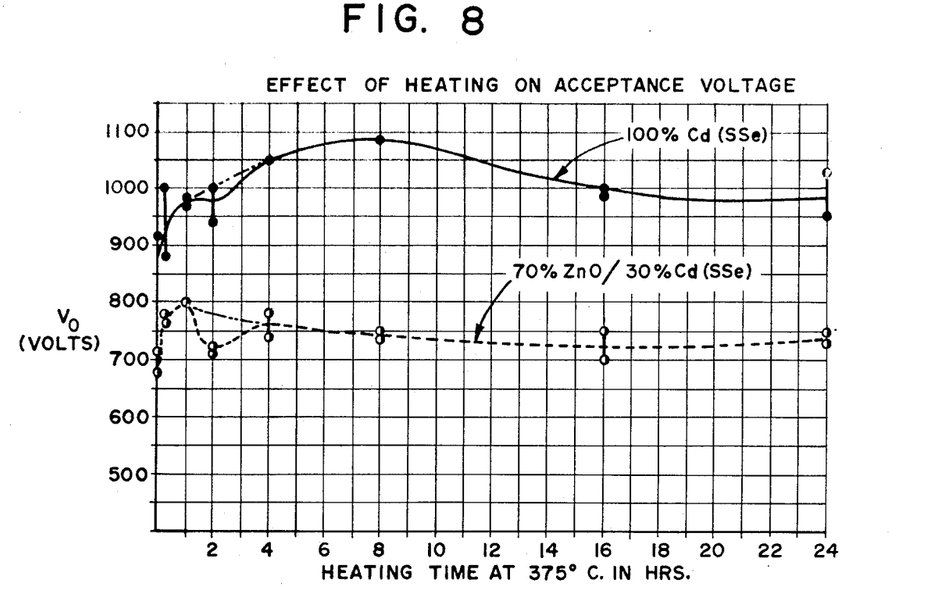
FIG. 8 is a graph showing curves for plates made with 100% Cd(SSe) and with 70% ZnO and 30% Cd(SSe) wherein heating time of the pigments at 375°C. is plotted against the acceptance voltages of the plates to show the effect of pigment heating on plate charge acceptance as a function of time.
Figure 9:
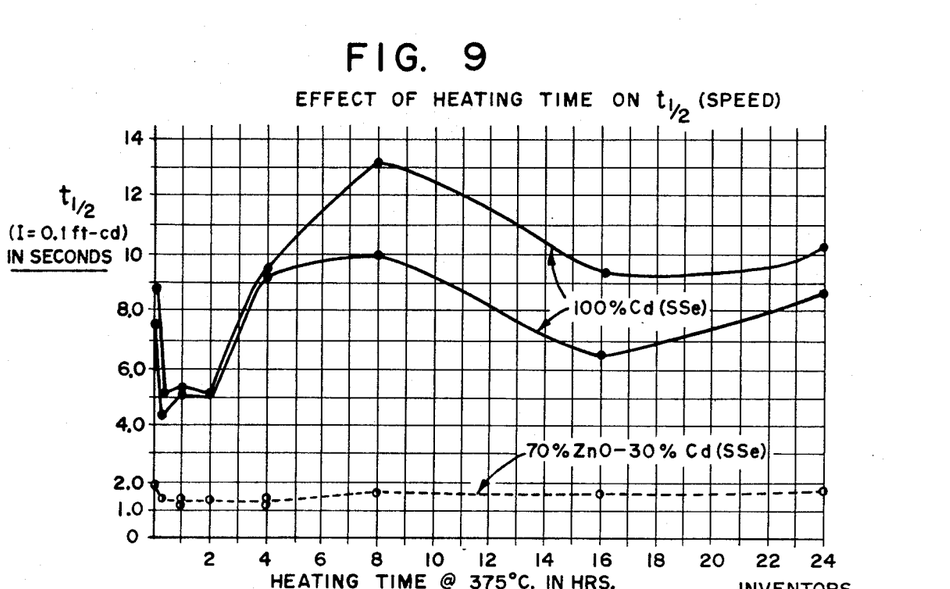
FIG. 9 is a graph showing two curves for plates made with 100% Cd(SSe) and one with 70% ZnO and 30% Cd (SSe) wherein heating time of the pigments at 375°C. is plotted against electrophotographic speed ($t\ \frac{1}{2}$) to show the effect of pigment heating on electrophotographic speed as a function of time.

The effects of heating are further illustrated in FIGS. 8 and 9. These curves were generated from coatings made from samples of cadmium sulfoselenide roasted for various lengths of time at 375°C. Coatings were made in a manner similar to Examples 9 through 20, except that toluene was used as a solvent. The solid curves show the results for coatings made with 100% cadmium sulfoselenide, while the broken lines show the comparable data for coatings in which 70% zinc oxide and 30% cadmium sulfoselenide was used. FIG. 8 shows that roasting generally results in an increase in acceptance potential with a more pronounced effect for the 100% cadmium sulfoselenide coatings. FIG. 9 shows a more complex effect on electrophotographic speed ($T_{1/2}$). There is a dramatic initial improvement in $T_{1/2}$ for the 100% cadmium sulfoselenide plate, while the plate containing 70% ZnO - 30% Cd(SSe) shows only a moderate change. After 4 hours of roasting, however, $T_{1/2}$ is back up to its initial level for the 100% cadmium sulfoselenide sample, whereas the charge acceptance of the 70% ZnO - 30% Cd(SSe) sample remains constant. It is also shown by these curves that the combination of cadmium sulfoselenide and zinc oxide produces the most dramatic electrophotographic speed increase (decrease in $T_{1/2}$) with the heating step producing secondary effects. Heating can also be beneficial in producing coatings with reduced fatigue effects, so that samples can be cycled repeatedly without deterioration in performance. For some applications fatigue of the photoconductive composition may be a problem.

More extensive studies of the roasting process revealed that there was an associated weight change in the Cd(SSe) pigment. At 375°C. after an initial rapid weight loss, attributable to desorption of water vapor, etc., there was a steady weight gain which is presumed to be some form of oxidation. The weight gain was furthermore found to follow a parabolic growth rate, such that the change in weight, $\Delta W$, was proportional to the square root of the roasting time, or $\Delta W = K' \sqrt{t}$.

This is a classical type of oxidation dependence. The rate constants $K'$, according to this model, has an Arrhenius type temperature dependence of the form $K' = c^{-Ea/kT}$ where Ea is an activation energy and k is Boltymann's constant. It can be seen that in order to establish a useful temperature time relationship, the experimental values of $K'$ for at least two temperatures must be determined in order to estimate the activation energy for the process.

This we were able to do for the temperatures of 350°, 375°C, and 475°C. At the latter temperature the oxidation rate proved to be so rapid so as to degrade the material before any useful samples could be extracted, and the resulting material was black in appearance. Nevertheless, an estimate of activation energy could be made from these data, and a table of temperatures and times required to reach "optimum" electrical properties was constructed. The optimum was based on the electrical measurements of samples of cadmium sulfoselenide roasted at 375°C. For an activation energy of 1.9 electron-volts, it is predicted that the following would hold:

| Roasting Temperature | Time to reach "optimum" |
|---|---|
| 300°C. | 3300 hours |
| 330°C. | 90 hours |
| 354°C. | 5.6 hours |
| 375°C. | 0.5 hours |
| 400°C. | 3 minutes |

Thus, there appears to be a narrow range of temperatures in which the cadmium sulfoselenide should be heated. We have found in runs at temperatures of 300°C. and 325°C. that the parabolic growth rate was no longer obeyed. At 300°C. we were able to get no significant improvement in electrical properties after more than 24 hours of roasting, and at 325°C. the observed improvement was barely detectable. Therefore, for a variety of reasons it seems unlikely that the desired improvement can be achieved at temperatures much below 350°C. At temperatures much above 400°C. the oxidation would proceed so rapidly as to pass the optimum before the system could reach thermal equilibrium, (i.e., some parts would be excessively oxidized while others may be under oxidized.)

EXAMPLES 21 THROUGH 24

It is indicated that the interaction between the cadmium sulfoselenide and zinc oxide is unique and is not due to the radiation transmission characteristics of the white pigment around the physically admixed cadmium sulfoselenide pigment in the binder layer. In Examples 22, 23 and 24, coatings were made in which other white pigments were substituted for the zinc oxide of Example 21. Pigment mixtures were weighed out as indicated below, transferred to Vitreosil crucibles, tamped and heated, uncovered for 15 minutes at 375°C. The air-cooled pigments were mixed by mortar and pestle with DeSoto E-09 styrene modified alkyd resin binder and toluene to give a mixture having a 6:1 pigment-to-binder ratio and a solids content of 55%. The mixtures were coated on Riegel conductive base stock EC45AA with a 32 Mayer rod and dried overnight at 50°C. The zinc sulfide sample was Superlith XXXHD from the C. J. Osborn Co. The TiO2 and MgO samples were Reagent Grade from Matheson Coleman and Bell.

| EXAMPLE | 21 | 22 | 23 | 24 |
|---|---|---|---|---|
| While Pigment | ZnO | ZnS | Tio2 | MgO |
| Cadmium Sulfoselenide to White Pigment Ratio | 3:7 | 3:7 | 3:7 | 5:5 |
| Victoreen Data | | | | |
| Maximum Charge Acceptance—Volts | 420 | 740 | 1050 | 490 |
| Dark Decay—Volts/Second | 12 | 4 | 8 | 30 |

| | | | | |
|---|---|---|---|---|
| T ½ (I=0.1 ft.-cd.)Second | 0.8 | 14.5 | 5.9 | 7.5 |
| Residual (1 ft.-cd.-sec.), Volts | 15 | 400 | 120 | 190 |

The slow electrophotographic speeds and high residual voltages of examples 22, 23 and 24 indicate that the unexpected photoconductive characteristics of the Cd(SSe)-ZnO combination is not due to radiation transparency of the zinc oxide. Comparing the results of Examples 26, 27 and 28 to those of Example 2 it will be seen that their white pigments, other than ZnO, provide decreased electrophotographic speed.

EXAMPLES 25 THROUGH 31

Although there may be some variation in electrical characteristics the following series of examples 25 through 31 illustrate that the invention is applicable to cadmium sulfoselenides generally. Good electrophotographic speeds and low residual voltages were obtained with cadmium sulfoselenides from different manufacturers. The results below also show that the invention is not limited to a narrow or specific ratio of sulfur to selenium in the cadmium sulfoselende. Except for the specific cadmium sulfoselenide pigment under test, the proportions and procedure for preparing the electrophotographic plate were the same as set forth in Example 1.

Imperial Medium Cadmium Red Conc and Extra Dark Red were obtained from Hercules, Incorporated. Maroon No. 69 was obtained from Shephered Chemical Company. Ferro Orange V8810 was obtained from the Ferro Corporation. Glidden Medium Red was obtained from the Glidden Company.

Harshaw Dark Reds No. 1,439 and 1,580 were obtained from the Harshaw Chemical Company.

The amount of heating required to realize optimum electrophotographic speeds from a particular lot of cadmium sulfoselenide pigment may vary, but there apparently is a limit as to increased photographic speed or charge acceptance which can be obtained by prolonged heating. Excessive oxidation will result in high residual voltages. In the examples given below, the initial speeds were adequate, but charge acceptances were low. It is seen that there is a progressive increase in charge acceptance with increased time of heating, with only a relatively small loss of photographic speed.

The coatings were prepared according to the procedure described in Example 1, except that the pigment heating time was varied.

| EXAMPLE | 32 | 33 | 34 | 35 | 36 | 37 |
|---|---|---|---|---|---|---|
| Time to heat Cd(SSe)-ZnO at 375°C—hours | 1 | 2 | 3 | 35 | 16 | 20 |
| Max. Charge Acceptance—volts | 440 | 560 | 640 | 550 | 700 | 600 |
| Dark Decay—volts/second | 11 | 11 | 8 | 8 | 12 | 6 |
| T ½ (I=0.1 ft.cd.) seconds | 1.0 | 1.4 | 1.5 | 1.6 | 1.4 | 1.7 |
| Residual (1 ft.-cd.-sec.) Volts | 5 | 10 | 15 | 10 | 20 | 20 |

From the data derived above and from other experimental data it has been determined that the heating required for the cadmium sulfoselenide varies substantially depending upon (1) the composition of the pigment and/or (2) the length of time and conditions under which the pigment has been stored. It has been found that some Cd(SSe) pigments can be substantially improved by heating for as little as 10 minutes at temperatures about 375° to 400°C. At such higher temperatures it is believed that heating beyond 4 hours will not materially improve the Cd(SSe) pigment. The Cd(SSe) pigment may also be heated at temperatures as low as 350°C., but generally require a longer heating time than that heated at higher temperatures.

| | Example | | | | | | |
|---|---|---|---|---|---|---|---|
| | 25 | 26 | 27 | 28 | 29 | 30 | 31 |
| | Cadmium sulfoselenide pigment | | | | | | |
| | Shepherd Maroon #69 | Imperial Med. Cd. Red. Conc | Imperial Extra Dk. Red | Glidden Medium Red | Harshaw Dk. Red 1439 | Harshaw Dk. Red 1580 | Ferro Orange V8810 |
| Victoreen data: | | | | | | | |
| Max. charge acceptance volts | 370 | 640 | 680 | 560 | 680 | 570 | 370 |
| Dk. decay, volts/sec | 6 | 10 | 6 | 18 | 7 | 10 | 7 |
| T₁/₂ (I=0.1 ft. c.) Sec | 1.6 | 1.9 | 3.2 | 1.6 | 2.6 | 1.9 | 2.2 |
| Residual (1 ft. cd. sc.) volts | 50 | 0 | 20 | 35 | 40 | 20 | 15 |

EXAMPLES 32 THROUGH 37

It may not be necessary to heat the cadmium sulfoselenide pigment or mixtures of it with photoconductive zinc oxide in order to realize very substantial electrophotographic speeds which are described in examples shown herein. It is not known precisely what happens when the Cd(SSe) alone or in combination with zinc oxide is heated at moderate temperatures below the decomposition temperature of the cadmium sulfoselenide. The 375°C. is considered a safe upper limit for mixtures of the two pigments. As stated above, the speed increase is apparently due to limited oxidation of the surface of the Cd(S, Se) which provides for improved particle-to-particle electron transfer.

EXAMPLES 38 THROUGH 42

The preferred binder for the cadmium sulfoselenide/zinc oxide electrophotographic plate is a styrene modified alkyd resin binder such as type E-09 produced by DeSoto, Inc. of Des Plaines, Ill., but there are other organic resin binders which also perform satisfactorily. In addition, as might be expected, combinations of resins may be used to obtain desired physical or mechanical properties such as flexibility, abrasion resistance, etc. The examples below illustrate the efficacy of binders and binder types other than DeSoto E-09. In the examples below the plates from which Victoreen measurements are recorded were prepared according to Example 1. Pigment-to-binder ratios are all 6:1.

| Example | 38 | 39 | 40 | 41 | 42 |
|---|---|---|---|---|---|
| Binder | E13A | E-028 | Elvacite 6046 | Glidden 6503 | Glidden 6503 *Vitel 207 |
| Chemical type | Styrene modified alkyd | Acrylic | Acrylic | Alkyd | *Polyester |
| Source | DeSoto Inc. | DeSoto Inc. | E. I. DuPont de Nemours | Glidden Company | Goodyear Rubber Company |
| Binder—binder-ratio | | | | | 1:1 |
| Cd. (SSe)/ZnO, by weight | 1:1 | 1:1 | 1:1 | 1:1 | 1:1 |
| Max. charge accpt.-volts | 400 | 590 | 360 | 690 | 560 |
| Dk. decay-volts/sec | 13 | 14 | 15 | 10 | 6 |
| $T_{1/2}$ (I=ft. cd.) sec | 0.3 | 0.4 | 0.2 | 1.1 | 0.8 |
| Residual (2 ft. cd. sec.) volts | 20 | 75 | 30 | 190 | 130 |

The results obtained in Example 4 above indicate that the use of the styrene modified alkyd resin EO-9 provided better overall electrical characteristics at the same Cd(SSe) to ZnO ratio. The photoconductive insulating compositions of examples 38 through 42 would be commercially acceptable, however, for a number of applications. The principal deficiency of compositions such as those of Examples 39, 41 and 42 are the high residual voltages.

The binder employed with the electrophotographic composition of this invention is preferably a styrene modified alkyd resin either used alone or in combination with other resins. For maintenance of good charge acceptance and ability to hold an electrical charge the binder should have high humidity resistance. In any event, any adverse effect by the binder on the photoelectrical characteristics of the Cd(SSe)-ZnO combination should be kept to a minimum while providing good mechanical characteristics. These include (1) providing for holding of the dispersed pigment to the conductive substrate; (2) providing a relatively impervious surface from which the electroscopic marking (toner) particles may be easily released; (3) providing for flexibility of the electrophotographic plate and (4) providing reasonable mechanical wear resistance.

EXAMPLES 43 THROUGH 48

Examples 43 through 48 demonstrate the photoconductive properties of a plate having a cadmium sulfide pigment containing no selenium. The pigment employed in this series is a cadmium sulfide marketed by Ferro Corporation as "Ferro Golden Yellow V-9,830." The resin binder used in the coatings is DeSoto E-09. The dry blend of pigment was hand-mixed and heated at 375°C. for four hours in a muffler furnace before being dispersed in the resin-toluene solution. The composition was then coated on an electroconductive base stock and dried in a 50°C. oven overnight. The following is a list of Victoreen measurements made on the dried and conditioned electrophotographic plates having the indicated ratios of CdS to ZnO.

| EXAMPLE | 43 | 44 | 45 | 46 | 47 | 48 |
|---|---|---|---|---|---|---|
| Pigment Composition % | | | | | | |
| Cadmium Sulfide (Ferro Golden Yellow V9830) | 100 | 70 | 50 | 30 | 20 | 10 |
| Zinc Oxide (Photox 80) | 0 | 30 | 50 | 70 | 80 | 90 |
| Charge Acceptance, VdC | >1,250 | 1,000 | 850 | 600 | 600 | 630 |
| Dark Decay, V/sec. | * | 5 | 5 | 4 | 3 | 3 |
| $T_{1/2}$, (I=1 ft.cd.)sec. | >10.00* | 4.7 | 2.0 | 1.2 | 1.3 | 1.2 |

* Off scale on recorder.

EXAMPLES 49 THROUGH 54

The same procedures as in Examples 43 through 48 were employed to prepare Examples 49 through 54 except that the cadmium pigment contained a small amount of CdSe believed to be about 20% of the Cd(SSe) and sold as "Ferro Orange V-8810." The effect of this low selenium orange pigment on the photoconductivities of plates at various Cd(SSe) to ZnO ratios is shown in the following Victoreen measurements.

| EXAMPLE | 49 | 50 | 51 | 52 | 53 | 54 |
|---|---|---|---|---|---|---|
| Pigment Combination, % | | | | | | |
| Cd(SSe) (Ferro Orange V-8810 | 100 | 70 | 50 | 30 | 20 | 10 |
| ZnO (Photox 80) | 0 | 30 | 50 | 70 | 80 | 90 |
| Charge Acceptance, VdC | 1,250* | 680 | 520 | 550 | 360 | 430 |
| $T_{1/2}$, (I=.1 ft.cd.)sec. | 2.6 | 1.6 | 1.4 | 2.1 | 2.6 | 3.8 |
| Dark Decay, V/sec. | 35 | 30 | 14 | 6 | 4 | 3 |
| Residual Charge, (1 ft.cd.sec.)VdC | 80 | 15 | 15 | 15 | 20 | 60 |

* Off scale on recorder.

From the above and the data of Examples 43–48 and 49–54 it can be seen that the incorporation of the ZnO pigment results in improved speed and performance for a wide range of composition for the Cd(SSe), and even provides for substantial electrophotographic speed increases when combined with cadmium sulfide, although the speeds were substantially slower than those for samples containing cadmium sulfoselenide.

In order to measure the electrophotographic speed of plates made in accordance with the above examples, quantum yield measurements were made on such plates having varying ratios of cadmium sulfoselenide to zinc oxide and these were compared with each other and with known commercial electrophotographic plates.

As discussed above, two of the principal requirements for a commercial electrophotographic composition are that (1) it must retain a substantial electric charge for some reasonable length of time and (2) it must be capable of having the charge reasonably rapidly dissipated by a light source. The first requirement implies that there must be barriers to charge flow, i.e., "traps" or "blocking contacts" in the electrophotographic composition which would result in retention of the charge. It is believed that the surfaces of particles within the photoconductive layer contain such "traps." The second requirement implies that the photoconductive composition is capable of photoconduction, i.e., that upon exposure to light the electrical resistance of the photoconductive layer will be substantially decreased and the charge dissipated. This is accomplished by the generation of photo-carriers and the transport of these carriers through the photoconductive layer to the conductive substrate of the electrophotographic plate. For commercial electrophotographic plates, it is preferable that the photoconductive layer be broadly responsive to wavelengths in the visible light spectrum.

Quantum yield measurements provide a measure of the efficiency of the generation and transportion of photo-carriers in a photoconductive layer. Quantum yield (Y) is therefore defined as: The number of photo-carriers which traverse the layer per incident photon from the light radiation present upon photographic exposure, i.e.

Y = number of photo-carriers traversing layer/number of incident photons/cm$^2$ = Ne/Nph In the event that the photoconductive layer has traps or blocking contacts, the formula provides a measure of the efficiency of the photoconductor against the ideal efficiency of such a layer. Thus the measured number of photo-carriers which traverse the photoconductive layer is a measure of efficiency versus the layer for the maximum quantum yield, i.e., one photo-carrier being generated for each incident photon of light radiation received by the layer.

It should also be noted that the efficiency of photo generation of carriers is dependent upon the wavelength of the light radiation. Accordingly, quantum yield is most commonly expressed as a function of wavelength. Thus the quantum yield at a given wavelength is a measure of the spectral response of the photoconductor.

As shown in FIGS. 1–7, each quantum yield curve is shown as a function of wavelength expressed in nanometers.

For the quantum yield curves shown in FIGS. 1–7 the quantum yield was related to measurements of surface voltage of the photoconductive layer by establishing the relationship between the observed voltage and the surface charge density as follows: The photoconductive layer being tested was first charged negatively to a voltage V and then discharged incrementally with known amounts of positive corona charge. The surface voltage was then plotted as a function of the positive charge required to neutralize the surface charge, giving us the relationship between V (surface voltage) and q (neutralizing charge). It is then possible to associate a given $\Delta V$ with a certain change in charge $\Delta q$ from which we can compute the number of charge carriers involved, $n_e = \Delta q/e$. The light discharge characteristics of the photoconductive layer was then measured by charging it to the desired voltage and then discharging it in an amount $\Delta V$ with a known exposure $\Delta E$ of known wavelength by means of a calibrated zenon flash lamp and interference filters. With this known exposure the number of photons $n_{ph}^{(\lambda)}$ of a given wavelength can be calculated for the discharging of the layer by an amount $\Delta V$ and hence it is found that $Y_\lambda$ = Ne/Nph.

In performing the quantum yield measurements as set forth in FIGS. 1–7, the procedure was to adjust the xenon flash intensity (by means of neutral density filters) so that $\Delta V$ will be between 20–30% of the initial charged voltage on the photoconductive layer. Discharging the photoconductive composition by only 20–30% insures that the internal electric field E (E $\approx$ V/thickness) does not fall so low as to interfere with the efficient collection of photoelectrons. Accordingly, the electrical conditions in the photoconductor are held approximately constant throughout the measurement while the light exposure is varied.

The plotted curves of FIGS. 1–7 are shown on logarithmic graphs as a function of wavelength and in all of the Figures unity represents the ideal or maximum generation and transportation of photo-carriers in the photoconductor.

Figure 1:
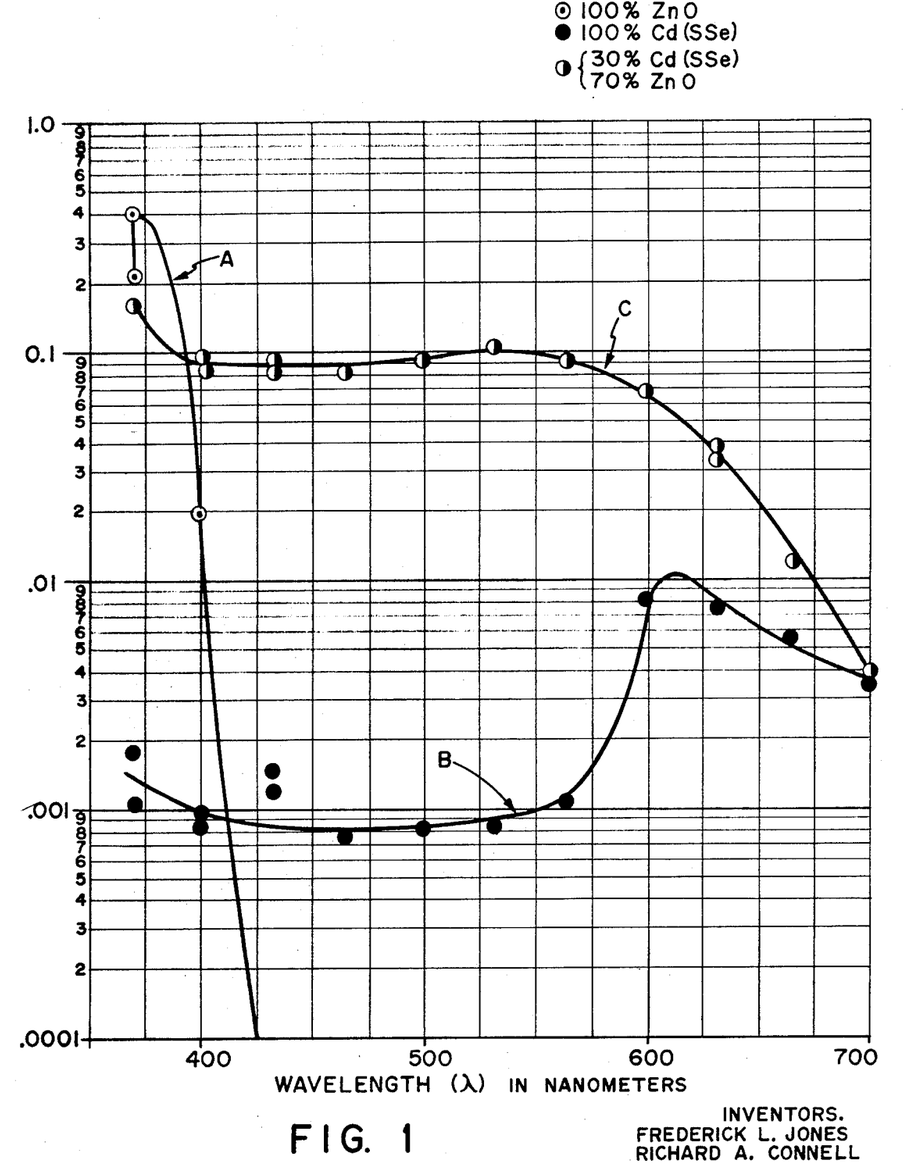
FIG. 1 is a logarithmic graph having three curves showing the quantum yield of electrons per incident photons for a plate made of photoactive constituents of 100% zinc oxide, 100% cadmium sulfoselenide and the combination of 30% cadmium sulfoselenide and 70% zinc oxide in accordance with the invention.

As shown in FIG. 1, the curves A and B represent the quantum yield curves of plates made with the two constituents of the photoconductive composition of the invention. Accordingly, for curve A the photoconductive constituent of the plate was 100% zinc oxide and for curve B the photoconductive constituent of the plate was 100% cadmium sulfoselenide. Curve C represents the quantum yield results for a plate with a photoconductive composition containing 30% cadmium sulfoselenide and 70% zinc oxide made in accordance with Example 1 above. The photoconductive composition represented by curve C shows very fast response to light substantially across the visible spectrum. Curve A shows that zinc oxide alone is very responsive at wavelengths below 400 nanometers, but is not photoconductive at longer wavelengths. As shown by curve B, cadmium sulfoselenide is relatively slow for wavelengths up to about 600 nanometers.

Figure 2:
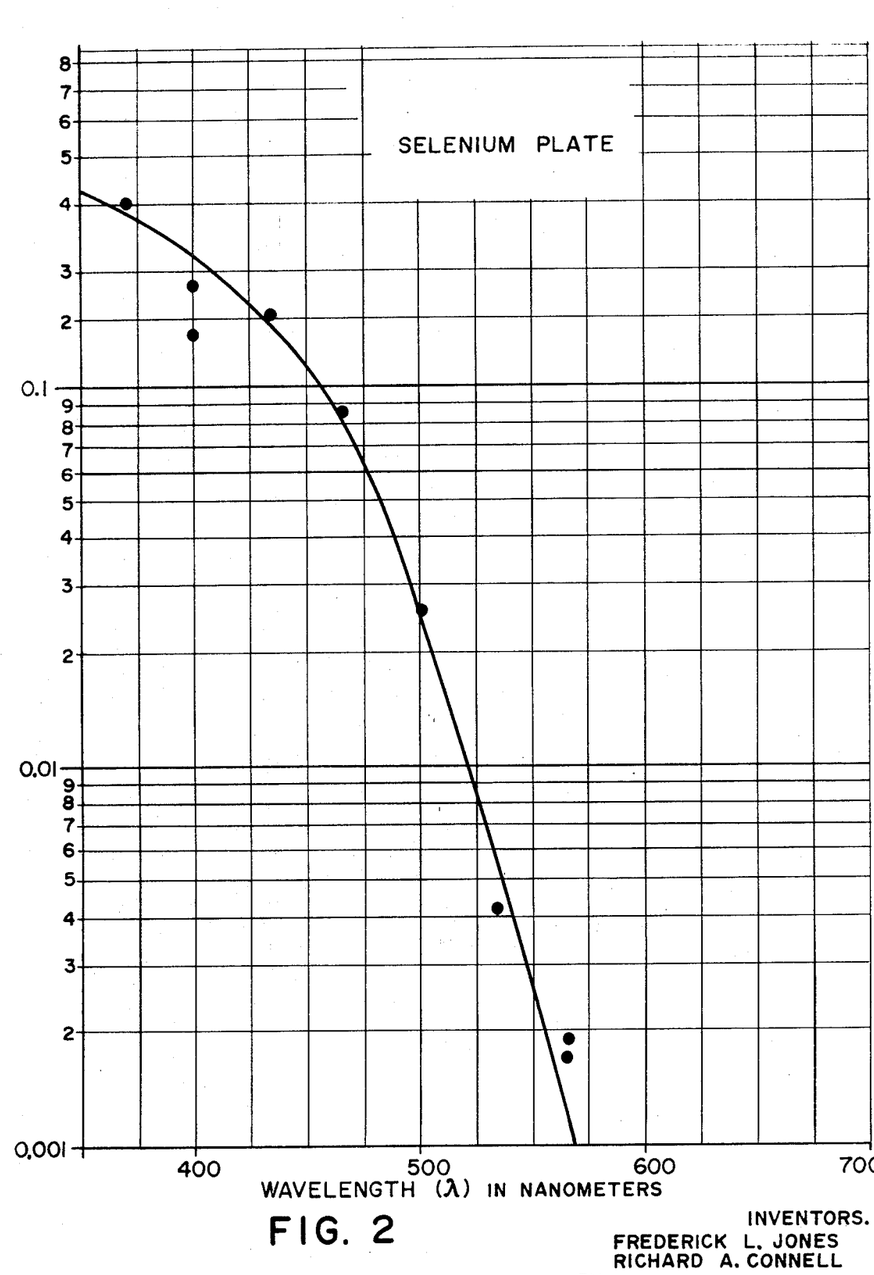
FIG. 2 is a logarithmic graph showing a quantum yield curve of a plate wherein the photoactive constituent is that in a commercial selenium xerographic plate.

As shown in FIG. 2 the quantum yield of a commercial amorphous selenium plate manufactured by Xerox Corporation was tested for comparison with the combination of 30% cadmium sulfoselenide and 70% zinc oxide as the photoconductive composition. As shown in FIG. 2 the selenium plate curve shows that its quantum yield equals or exceeds the yield of curve C of FIG. 1 only at wavelengths of less than about 460 nanometers.

Figure 3:
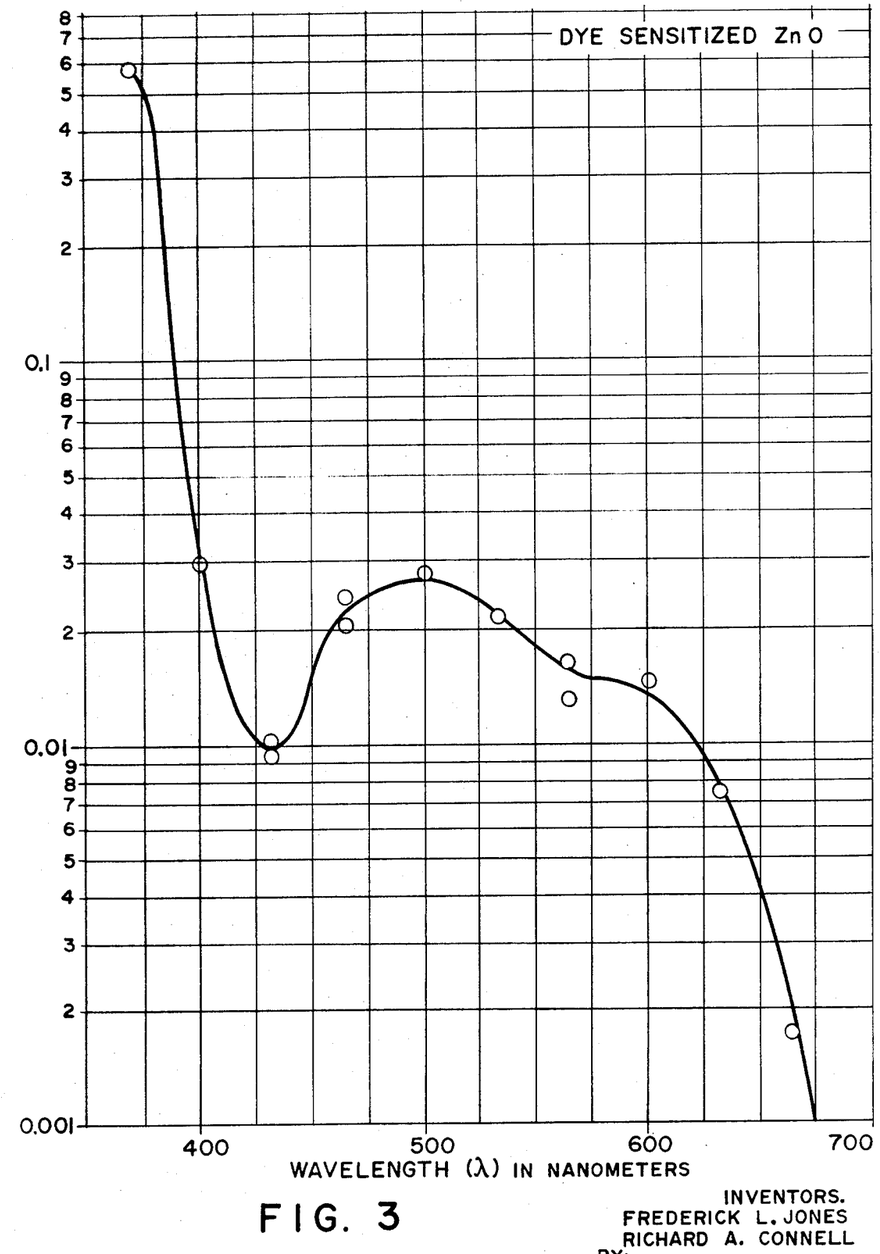
FIG. 3 is a logarithmic graph showing a quantum yield curve of a commercial electrophotographic plate wherein the photoactive constituent is dye sensitized zinc oxide.

Quantum yield tests were also conducted on commercially available zinc oxide coated paper used in the direct copying process. Dye sensitized zinc oxide coated paper (Nashua L300) was tested and the measurements plotted as shown in FIG. 3. It will be seen that the spectral response was very good at wavelengths below 400 nanometers, but for the remainder of the visible spectrum it was less than half as fast electrophotographically as the combination of cadmium sulfoselenide and zinc oxide as shown in curve C of FIG. 1. Thus even commercially acceptable dye sensitized zinc oxide plates do not possess the electrophotographic speed of the composition of the invention except in wavelengths of less than about 400 nanometers.

Figure 4:
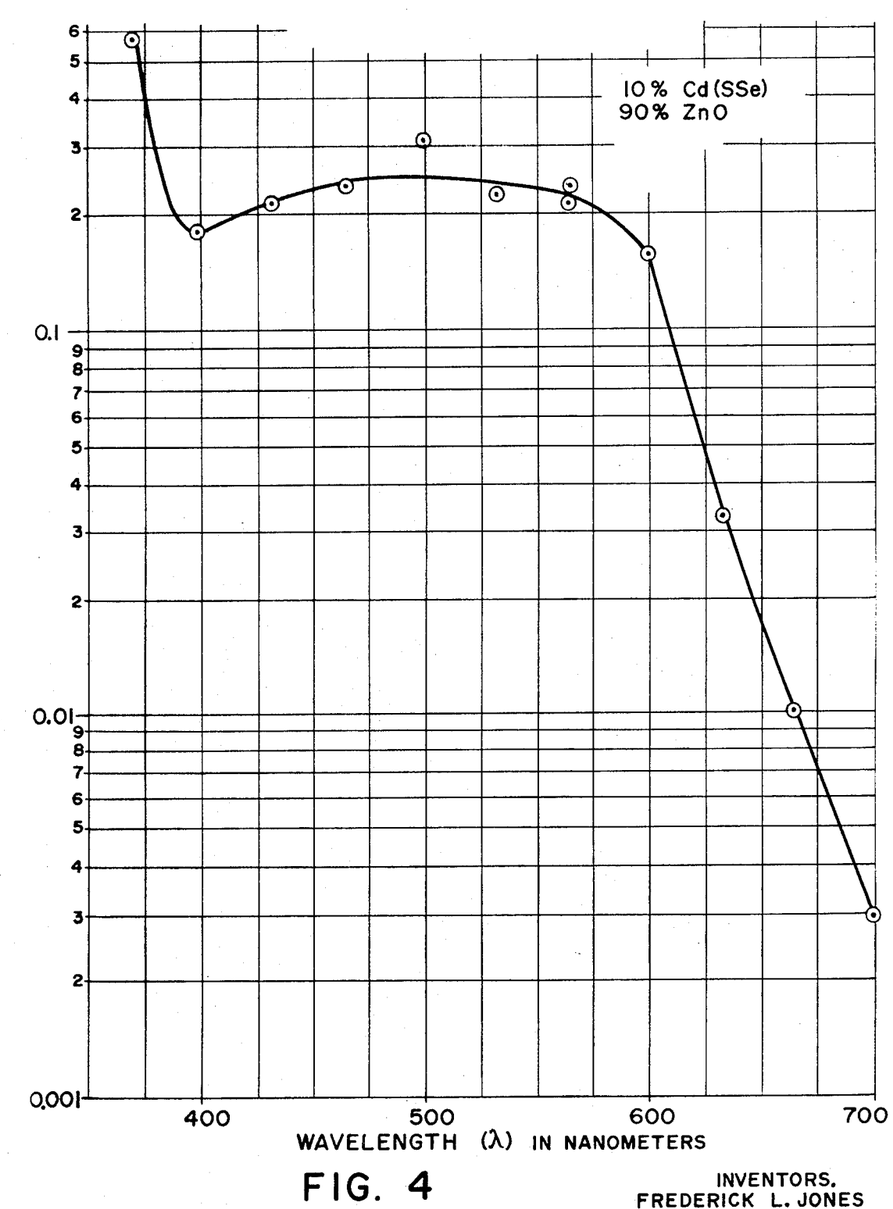
FIG. 4 is a logarithmic graph showing a quantum yield curve of a plate wherein the photoactive constituent is a combination of 10% cadmium sulfoselenide and 90% zinc oxide.

As shown in FIG. 4, a photoconductive composition containing 10% cadmium sulfoselenide and 90% zinc oxide made in accordance with Example 6 above was tested and showed even faster response to a broad spectrum in the visible light range than that of curve C of FIG. 1. As indicated in Example 6, however, the residual voltage for such an electrographic plate was substantially higher than that of the preferred ratio of about 20% to 40% cadmium sulfoselenide and 60% to 80% zinc oxide for the photoactive composition. While such a composition may be useful for some applications, the relatively high residual voltage would have to be taken into account.

Figure 5:
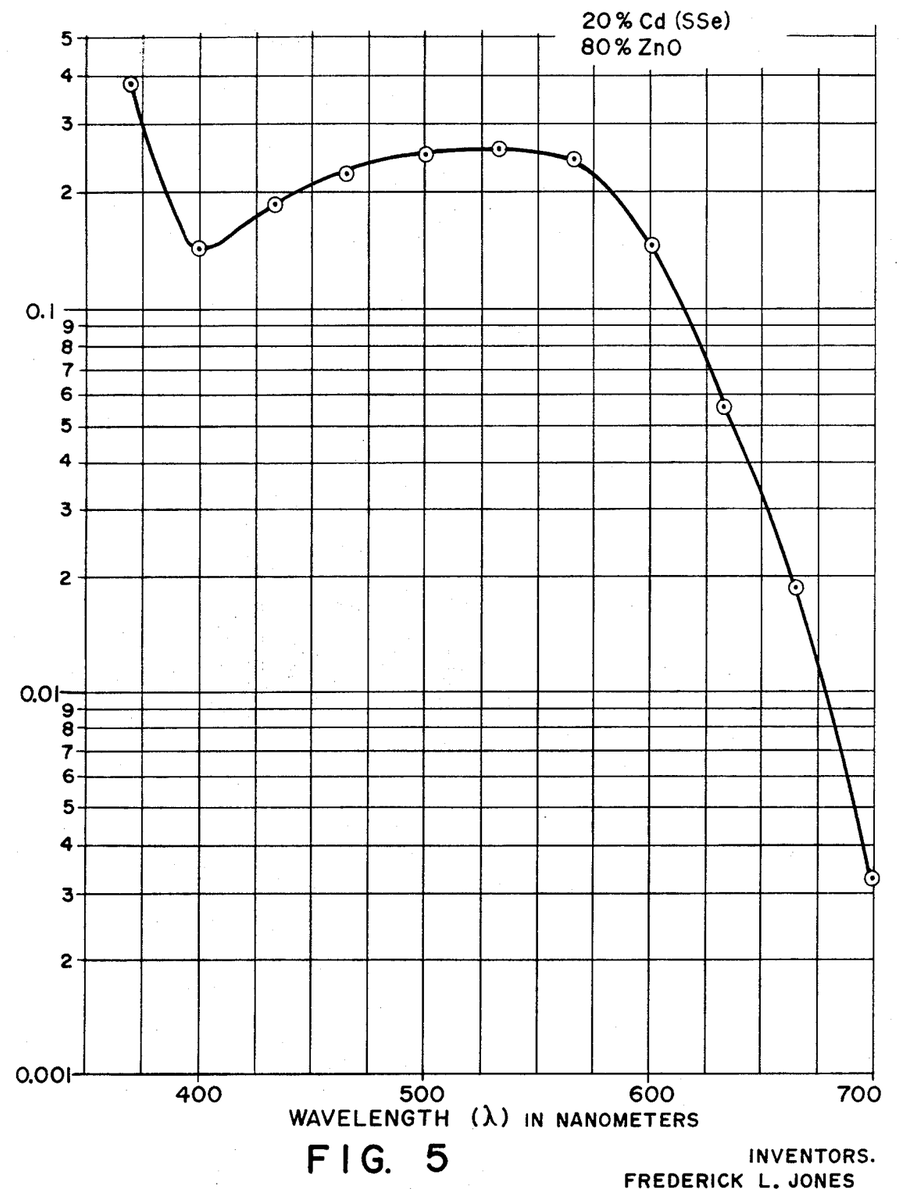
FIG. 5 is a logarithmic graph showing a quantum yield curve of a plate wherein the photoactive constituent is 20% cadmium sulfoselenide and 80% zinc oxide.

In FIG. 5 the curve represents quantum yield measurements of an electrophotographic plate made in accordance with Example 5 above and containing 20% cadmium sulfoselenide and 80% zinc oxide. Again the quantum yield curve shows very fast response over a broad range of the visible spectrum.

Figure 6:
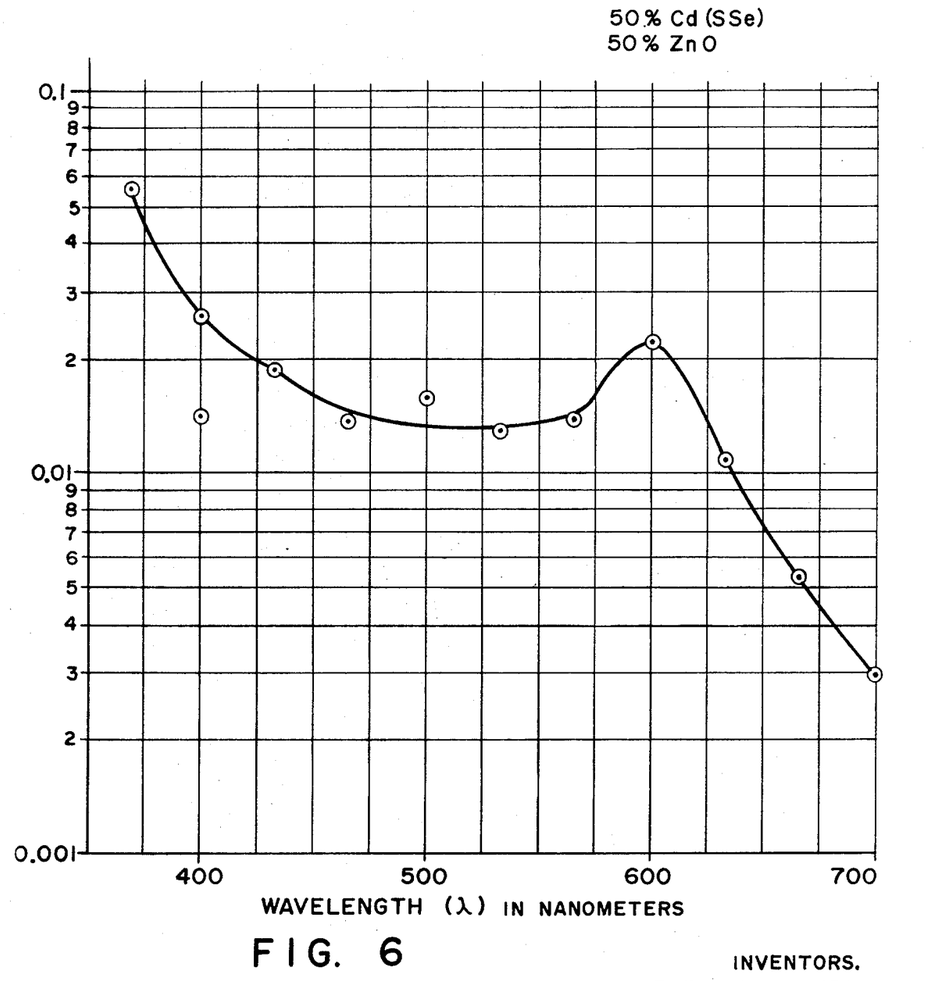
FIG. 6 is a logarithmic graph showing a quantum yield curve of a plate wherein the photoactive constituent is 50% cadmium sulfoselenide and 50% zinc oxide.

FIG. 6 represents a quantum yield curve of an electrophotographic plate wherein the photoactive composition was made in accordance with Example 4 above with 50% cadmium sulfoselenide and 50% zinc oxide. The results show that for the central portion of the visible spectrum this ratio of Cd(SSe) provides a photoconductive composition which is somewhat slower than that shown in curve C of FIG. 1, but is comparable in speed to the commercial zinc oxide plate of FIG. 3.

Figure 7:
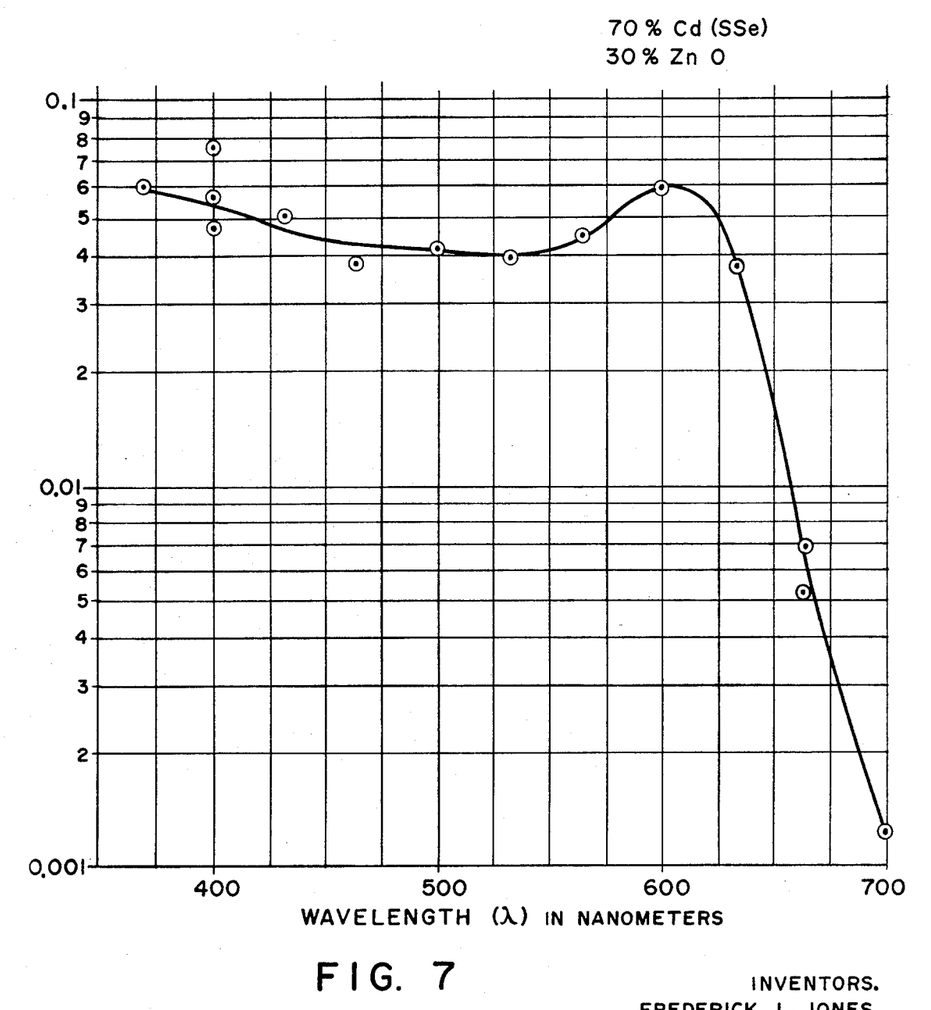
FIG. 7 is a logarithmic graph showing a quantum yield curve of a plate wherein the photoactive constituent is 70% cadmium sulfoselenide and 30% zinc oxide.

FIG. 7 represents the quantum yield curve for an electrophotographic plate made in accordance with Example 3 above wherein the photoactive composition was 70% cadmium sulfoselenide and 30% zinc oxide. The spectral response curve as shown is also below that of curve C of FIG. 1 for the preferred ratio of 30% cadmium sulfoselenide and 70% zinc oxide, but still has better electrophotographic speed and spectral response than the commercially used plates of FIGS. 2 and 3.

The quantum yield measurements represented in FIGS. 1–7 thus indicate that the combination of cadmium sulfoselenide and zinc oxide as the photoconductive composition of an electrophotographic plate provides electrophotographic speeds which are faster than known commercial electrophotographic compositions over a substantially wider spectrum. Thus the combination of cadmium sulfoselenide and zinc oxide as the photoactive composition for an electrophotographic plate should exceed present commercially used plates in these respects.

To further ascertain and compare the performance of these various photoconductors to xenon flash illumination, direct measurements were obtained through an optical system approximating that found in commercial office copiers. These direct measurements were for the purpose of establishing the relative speeds of the various coatings as follows. The technique employed was similar to that for measuring quantum yield except that the filters used were a Wratten 2-A filter to absorb the ultraviolet radiation and neutral density filters to control the relative intensity. The UV absorbing filters excluded ultraviolet light which would have given misleading results, since ordinary lens optics do not transmit ultraviolet.

As with the quantum yield measurements, the electrophotographic plate was discharged by an amount $\Delta V$ from which the corresponding number of charge carriers $n_e$ was deduced. A relative speed number (S) was then established S = $N_e$/relative exposure where the number of photo-carriers discharged were related back to a standard experimental exposure. The speeds for commercially sold dye sensitized zinc oxide copy paper (Nashua L-300) was 7.5 and that for a commercial Xerox selenium plate was 12.2. For an electrophotographic plate made in accordance with Example 1 above, the relative speed was 61 and the speed of a plate made in accordance with Example 5 above was 49. Thus the speed of an electrophotographic plate having as the photoactive composition a combination of cadmium sulfoselenide and zinc oxide in accordance with the invention was significantly faster than known commercial electrophotographic plates.

It will thus be seen that the objects set forth above, among those made apparent from the preceding description, are efficiently attained and, since certain changes may be made in carrying out the above processes and in the composition set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. A photoconductive insulating composition having improved characteristics for use in electrophotography comprising, in combination, a particulate cadmium sulfoselenide pigment wherein the selenium to sulfur ratio in said cadmium sulfoselenide is $[n(Se)/n(S)+n(Se)]$ and equals from 0.05 to 0.7 where $n$ is the number of atoms of sulfur or selenium, and a particulate photoconductive zinc oxide pigment wherein the proportion of cadmium sulfoselenide is from 20 percent to 70 percent by weight and the proportion of zinc oxide is from 30 percent to 80 percent by weight, said cadmium sulfoselenide being uniformly heated to a temperature of from 350° C. to 400° C.

2. The photoconductive insulating composition defined in claim 1, wherein said cadmium sulfoselenide has been heated to a temperature of from 350°C. to 400°C. for a period of from 10 minutes to 8 hours.

3. The photoconductive insulating composition defined in claim 1, wherein said particulate cadmium sulfoselenide is a solid solution and the ratio of selenium to sulfur and selenium is from 40 to 60 mole percent.

4. A photoconductive insulating composition having improved characteristics for use in electrophotography consisting of
    A. from 30 to 80 percent by weight of particulate zinc oxide pigment, and
    B. from 20 to 70 percent by weight of particulate cadmium sulfoselenide pigment,
        1. said cadmium sultoselenide being from 40 to 60 mole percent selenium, and
        2. said cadmium sulfoselenide having been heated at about 375°C. for from one-half to 2 hours.

5. The process of making a photoconductive insulating composition for use in electrophotography comprising the steps of:
    A. heating particulate cadmium sulfoselenide having a selenium content of from 5 to 50 atomic percent
        1. to a temperature of from 350° to 400°C.
        2. for from 10 minutes to 8 hours,
    B. cooling said cadmium sulfoselenide and then
    C. intimately admixing said cadmium sulfoselenide with particulate photoconductive zinc oxide to form a mixture thereof,
        1. in a ratio of from 20 percent to 70 percent cadmium sulfoselenide to from 30 percent to 80 percent zinc oxide, and then
    D. dispersing said mixture in an electrically insulating organic resin binder.

6. An electrophotographic plate having improved electrophotographic characteristics including increased electrophotographic speed, broad spectral response and commercially acceptable electrostatic charge acceptance, comprising:
    A. a substantially electrically conducting substrate, and
    B. a thin layer of an electrophotographic composition coated on said substrate comprising
        1. from 20 percent to 70 percent of particulate cadmium sulfoselenide pigment, having a mole percent ratio of selenium to sulfur of from 0.05 to 0.7,
  a. said cadmium sulfoselenide pigment having been uniformly heated to a temperature of from 350°C. to 400°C.,
  2. from 30 percent to 80 percent of particulate photoconductive zinc oxide pigment,
  3. dispersed in a substantially electrically insulating organic resin binder.

7. The electrophotographic plate defined in claim 6, wherein said cadmium sulfoselenide is a solid solution having from 40 to 60 mole percent selenium.

8. The electrophotographic plate of claim 6, wherein said cadmium sulfoselenide is heated at a temperature of from 350°C. to 400°C. for a period of from 10 minutes to 8 hours before being dispersed in said binder.

9. An electrophotographic plate comprising
  A. a substantially electrically insulating organic resin binder and
  B. a photoconductive insulating composition dispersed in said binder to form a photoconductive coating and consisting of
    1. from 20 percent to 70 percent particulate cadmium sulfoselenide pigment by weight,
      a. said cadmium sulfoselenide having from 40 to 60 mole percent selenium, and
      b. said cadmium sulfoselenide having been heated to a temperature of about 375°C. for a period of from one-half to 2 hours,
    2. from 30 percent to 80 percent photoconductive zinc oxide pigment by weight, and
  C. a substrate to which said coating is adhered.

10. The electrophotographic plate defined in claim 9 wherein said photoconductive insulating composition consists of from 20 to 40 percent particulate cadmium sulfoselenide pigment by weight with the remainder being essentially zinc oxide pigment.

11. An electrophotographic process comprising the steps of:
  A. electrostatically charging a photoconductive insulating layer comprising
    1. 20 percent to 70 percent particulate cadmium sulfoselenide having a mole percent ratio of selenium to sulfur of from 0.05 to 0.7 and which has been heated to a temperature of from 350°C. to 400°C. and then cooled, and
    2. 30 percent to 80 percent particulate photoconductive zinc oxide
    3. in an organic resin binder,
  B. exposing said photoconductive layer to an energy pattern to discharge portions of said electrostatic charge and form a varying charge pattern on said layer, and then
  C. depositing electroscopic particulate material in conformity to said varying charge pattern to form an image.

12. The process defined in claim 11 wherein said electroscopic particulate material is transferred and fused to a copy sheet from said photoconductive insulating layer.

* * * * *